US007216409B1

(12) United States Patent
Chiu et al.

(10) Patent No.: US 7,216,409 B1
(45) Date of Patent: May 15, 2007

(54) GEAR PULLER

(76) Inventors: Ching-Su Chiu, No. 327, Peng Yi Rd., Taiping City, Taichung Hsien (TW); Chung-Cheng Chiang, No. 327, Peng Yi Rd., Taiping City, Taichung Hsien (TW)

( * ) Notice: Subject to any disclaimer, the term of this patent is extended or adjusted under 35 U.S.C. 154(b) by 0 days.

(21) Appl. No.: 11/301,299

(22) Filed: Dec. 12, 2005

(51) Int. Cl.
*B23P 19/04* (2006.01)

(52) U.S. Cl. .......................................... 29/259; 29/255

(58) Field of Classification Search .................. 29/259, 29/255, 256, 260–263
See application file for complete search history.

(56) References Cited

U.S. PATENT DOCUMENTS 5,887,328 A * 3/1999 Rydin et al. .................. 29/259
6,665,918 B1 * 12/2003 Williams ..................... 29/259
2006/0200962 A1 * 9/2006 Hu .............................. 29/259

* cited by examiner

*Primary Examiner*—Lee D. Wilson
(74) *Attorney, Agent, or Firm*—William E. Pelton, Esq.; Cooper & Dunham LLP

(57) ABSTRACT

A gear puller has a screw shaft, a connecting seat, multiple paws and a fixed element. The screw shaft is attached to a shaft and has a hexagonal head and a tip. The connecting seat is connected rotatably to the screw shaft and has a body, a threaded stub and multiple arms. Each arm is formed on the body and has two hangers and a gap. The paws are pivotally mounted on the arms of the connecting seat and each has a pivotal axle and a hook. The pivotal axle is pivotally connected to the hangers on a corresponding arm, and the hook is formed on the action end to contact a circular element. The fixed element is mounted on the connecting seat and has a fixed board, a spring and a nut. The spring is mounted between the fixed board and the screw nut.

1 Claim, 7 Drawing Sheets

GEAR PULLER

BACKGROUND OF THE INVENTION

1. Field of the Invention

The present invention relates to a gear puller, and more particularly to a gear puller having two assemble models and multiple paws to pull a circular element and convenient in use.

2. Description of Related Art

A gear puller as shown in FIG. 7 is used to pull a circular element (70), such as a gear, a sleeve, a bearing or the like to detach the circular element (70) from a shaft (71). The circular element (70) has an external surface, a center and a through hole. The through hole is formed at the center of the circular element (70). The shaft (71) is set in the center of the circular element (70) and has a distal end. A conventional gear puller (60) substantially comprises a screw shaft (61), a connecting seat (62), four cranks (63) and two paws (64).

The screw shaft (61) selectively abuts against the distal end of the shaft (71) and has a proximal end, a distal end, an external surface, an external thread, a hexagonal head (611) and a tip (612). The external thread is formed on the external surface of the screw shaft (61). The hexagonal head (611) is formed on the proximal end and can be rotated by a wrench. The tip (612) is formed on the distal end of the screw shaft (61) and selectively abuts against the distal end of the shaft (71).

The connecting seat (62) is connected rotatably to the screw shaft (61) and has a center, a threaded hole and two ends. The threaded hole is formed in the center of the connecting seat (62) and is screwed with the screw shaft (61).

The cranks (63) are mounted with the connecting seat (62) and each has a front end and a rear end. The front ends of two cranks (63) are pivotally and respectively connected to the ends of the connecting seat (62) with pivots (80) (80 is not found in the drawing).

The paws (64) are pivotally connected to the cranks (63) and each has a proximal end, a distal end and two hooks (641). The hooks (641) are formed on the front end and the rear end of the paw (64), respectively and have different directions.

In use, rotating the screw shaft (61) to make the tip (612) contact with the distal end of the shaft (71), and the paws (64) are pivotally rotated to make the hooks (641) on the front ends grip onto the circular element (70) at a side opposite to the tip (612). Then, rotating the hexagonal head (611) of the screw shaft (61) to push against the distal end of the shaft (71) with the tip (612), such that the circular element (70) can be separated from the shaft (71).

Defects and shortcomings of the conventional gear puller (60) are listed as follows:

1. The gear puller (60) only has two paws (64) to hold the circular element (70) and are not replaceable. Therefore, the conventional gear puller (60) can not be applied to different condition and is not versatile in use. The user must prepare multiple kinds of gear pullers (60) to fit with different conditions, and this is costly.

2. When the gear puller (60) is in use, the user must hold both the paws (64) with one hand and rotate the screw shaft (61) with the other hand. Therefore, the conventional gear puller (60) is not convenient in operation.

SUMMARY OF THE INVENTION

The main objective of the present invention is to provide a gear puller with two assemble models and multiple paws to separate the circular element from a shaft.

A gear puller has a screw shaft, a connecting seat, multiple paws and a fixed element. The screw shaft is attached to a shaft and has a hexagonal head and a tip. The connecting seat is connected rotatably to the screw shaft and has a body, a threaded stub and multiple arms. Each arm is formed on the body and has two hangers and a gap. The paws are pivotally mounted on the arms of the connecting seat and each has a pivotal axle and a hook. The pivotal axle is pivotally connected to the hangers on a corresponding arm, and the hook is formed on the action end to contact a circular element. The fixed element is mounted on the connecting seat and has a fixed board, a spring and a nut. The spring is mounted between the fixed board and the screw nut.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
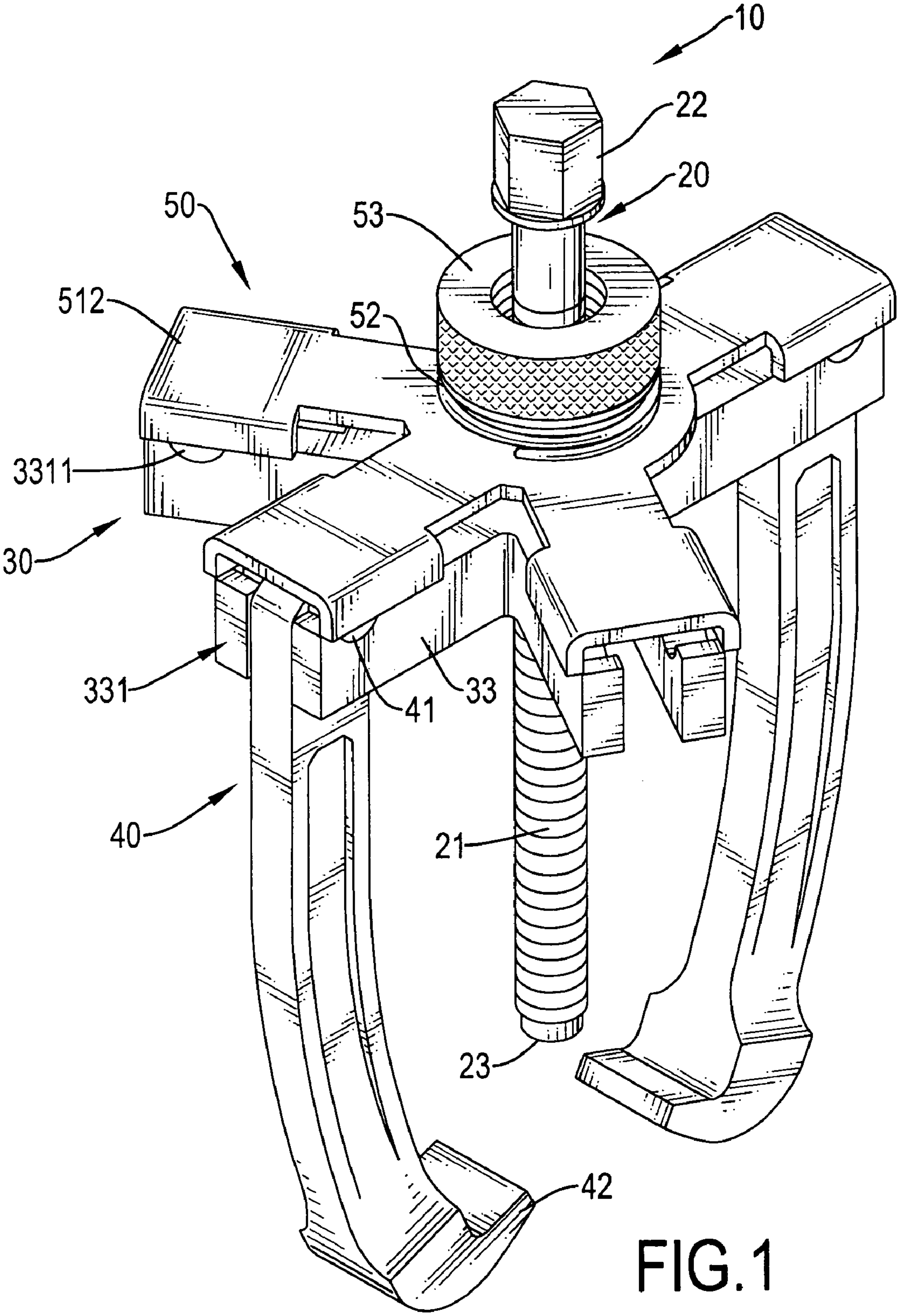
FIG. 1 is a perspective view of a gear puller in accordance with the present invention.

With reference to FIGS. 1, 2, 3 and 4, a gear puller (10) in accordance with the present invention is used for detaching a circular element (70) from a shaft (71). The circular element (70), such as a bearing or a flywheel has an external surface, a center and a through hole. The through hole is formed in the center of the circular element (70). The shaft (71) is extended into the through hole in the circular element (70) and has a distal end.

The gear puller (10) comprises a screw shaft (20), a connecting seat (30), multiple paws (40) and a fixed element (50).

The screw shaft (20) selectively abuts against the distal end of the shaft (71) and has a proximal end, a distal end, an external surface, an outer thread (21), a hexagonal head (22) and a tip (23). The outer thread (21) is formed on the external surface of the screw shaft (20). The hexagonal head (22) is formed on the proximal end and can be rotated by a wrench. The tip (23) is formed on the distal end of the screw shaft (20) and selectively contacts with the distal end of the shaft (71).

The connecting seat (30) is connected rotatably to the screw shaft (20) and has a body (31), a threaded stub (32) and four arms (33). The body (31) has a top, a bottom, a center and a through hole. The through hole is formed in the center of the body (31). The threaded stub (32) is hollow and mounted on the top of the body (31) and has an external surface, a central hole with an internal surface, an outer thread (321) and an inner thread (322). The central hole is axially defined through threaded stub (32) and communicates with the through hole in the body (31). The inner thread (322) is formed on the internal surface of the central hole and is screwed with the screw shaft (20). The outer thread (321) is formed on the external surface of the threaded stub (32). The arms (33) are formed on and radially extend from the body (31) and each has a proximal end, a end, two hangers (331) and a gap (332). The proximal end of each arm (33) is connected with the body (31). The hangers (331) are formed on and parallelly extend from the distal end of the arm (33) to define the gap (332) between the hangers (331). Each hanger (331) has a groove (3311) defined in the top, and the grooves (3311) in the hanger (331) are aligned with each other.

The paws (40) are pivotally connected to the connecting seat (30) and each has a pivotal end, an action end, a pivotal axle (41) and a hook (42). The pivotal axle (41) is mounted on and laterally extends from the pivotal end of the paw (40) and is held in the grooves (3311) of the corresponding hangers (331). The hook (42) is formed on the action end of the paw (40) and selectively grips with the external surface of the circular element (70). The fixed element (50) is mounted on the connecting seat (30) and has a fixed board (51), a spring (52) and a nut (53). The fixed board (51) has a central body, a fixed hole (511) and multiple sheathings (512). The central body has a top, a bottom and a center. The fixed hole (511) is formed in the center of the central body, and the threaded stub (32) on the connecting seat (30) extends through the fixed hole (511). The sheathings (512) radially extend from the central body and correspond respectively to the arms (33) of the connecting seat (30). Each sheathing (512) is a U-shaped and covers over the hangers (331) on the corresponding arms (33). The nut (53) is screwed onto the threaded stub (32) and has an internal surface and an inner thread. The inner thread is formed on the internal surface and is screwed with the outer thread (321) of the threaded stub (32). The spring (52) is mounted and compressed between the fixed board (51) and the nut (53) to push against the fixed board (51) so as to hole the pivotal axle (41) on the jaws (40) between the sheathings (512) and the grooves (3311) in the hangers (331). The screw shaft (20) is combined with the threaded stub (32), extends through the screw nut (53), the spring (52), the fixed board (51) and the through hole in the body (31).

Figure 2:
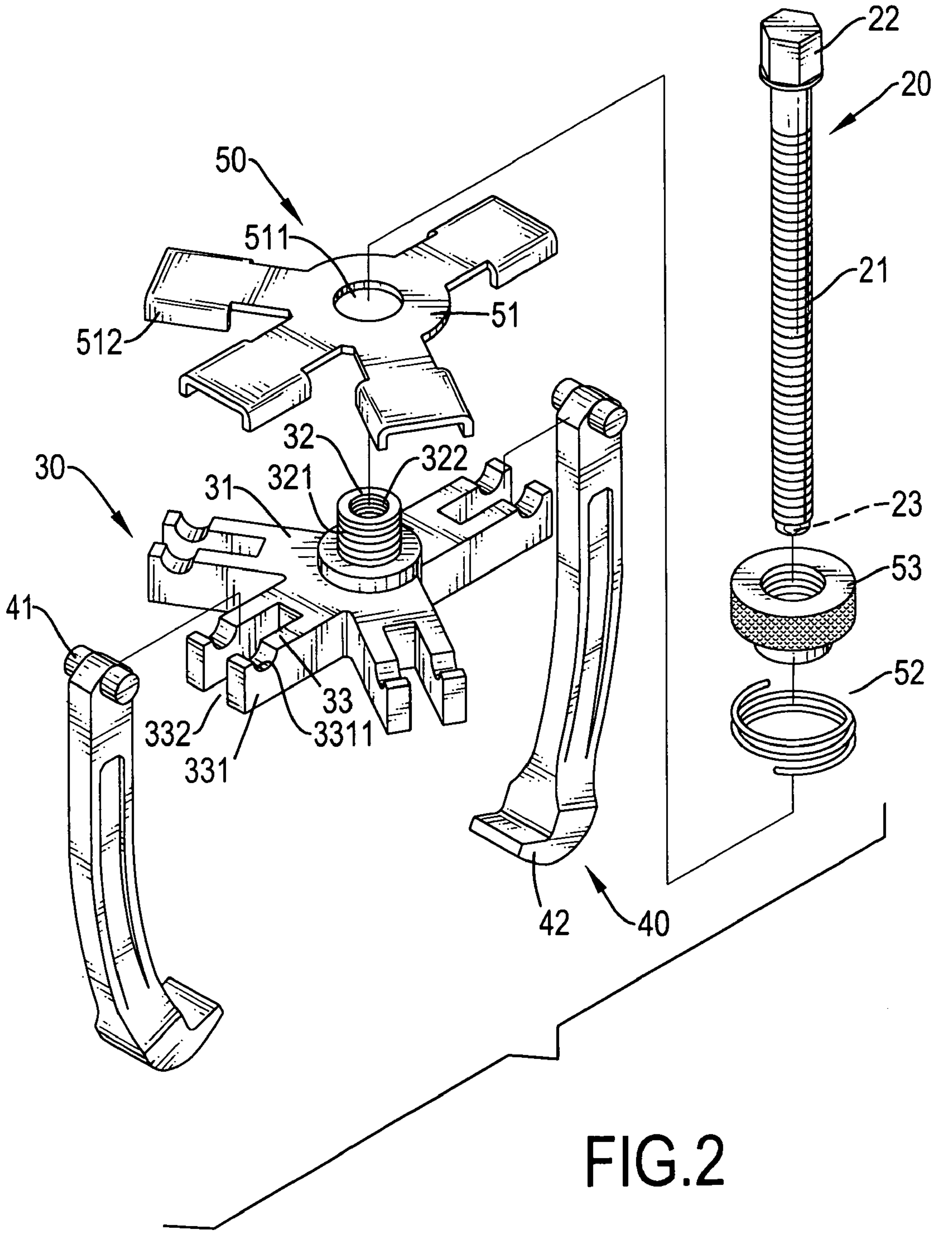
FIG. 2 is an exploded perspective view of the gear puller in FIG. 1.
Figure 3:
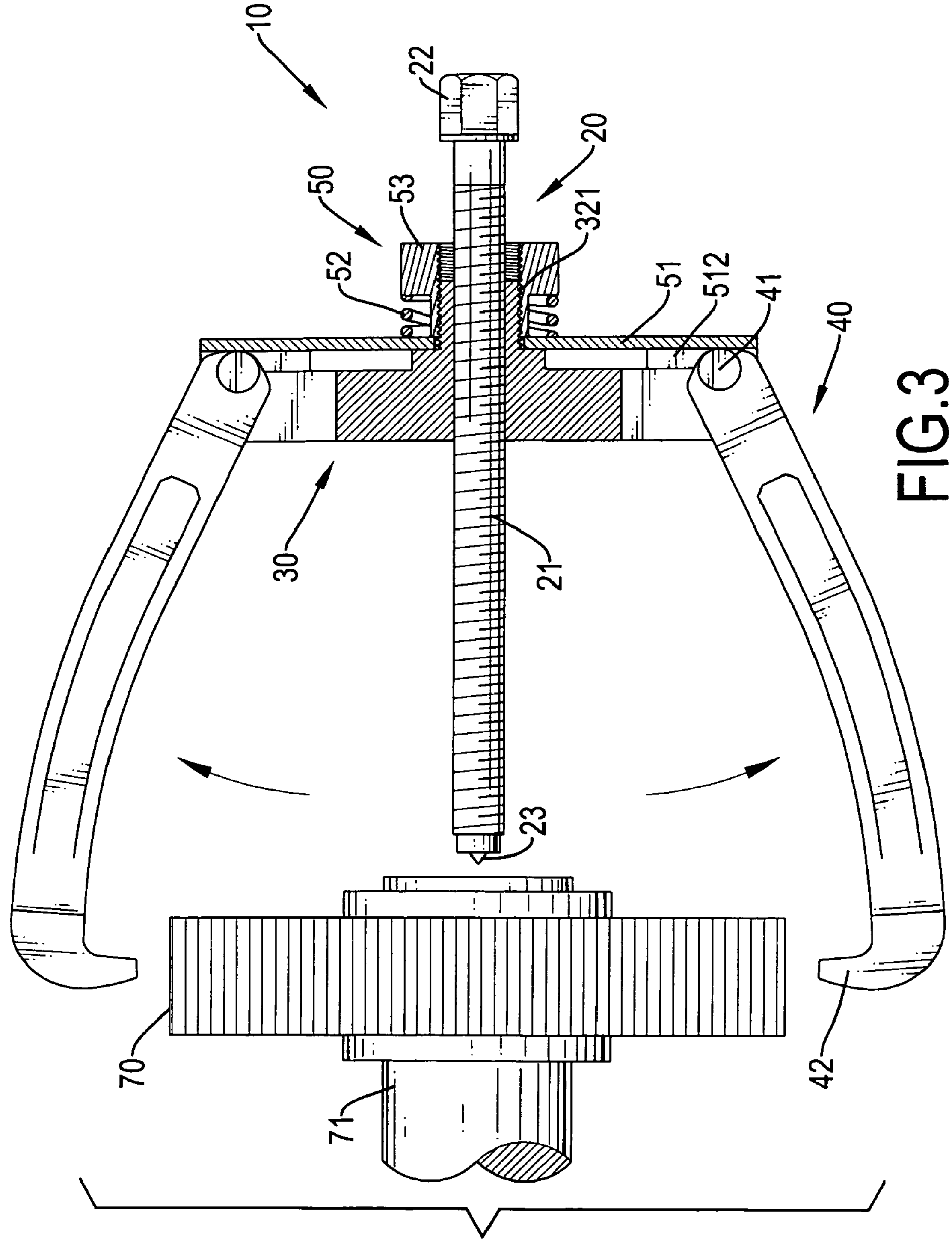
FIG. 3 is an operational side view in partial cross section of the gear puller in FIG. 1 showing that the gear puller is used to pull a circular element.

In use, the gear puller (10) has two assembled models. With reference to FIGS. 2 and 3, in a first assembled model, the pivotal axles (41) of the paws (40) are held respectively into the grooves (3311) in the hangers (331) and the hooks (42) faces to each other. Then, the fixed board (51) is mounted around the threaded stub (32) to make the sheathings (512) cover the arms (33) with the hangers (331), respectively. The spring (52) is mounted around the threaded stub (32), and the nut (53) is screwed onto the threaded stub (32) and abuts against the spring (52). The screw shaft (20) is screwed through the inner thread (322) in the threaded stub (32) and extends through the nut (53), the spring (52), the fixed board (51) and the through hole in the body (31).

Figure 4:
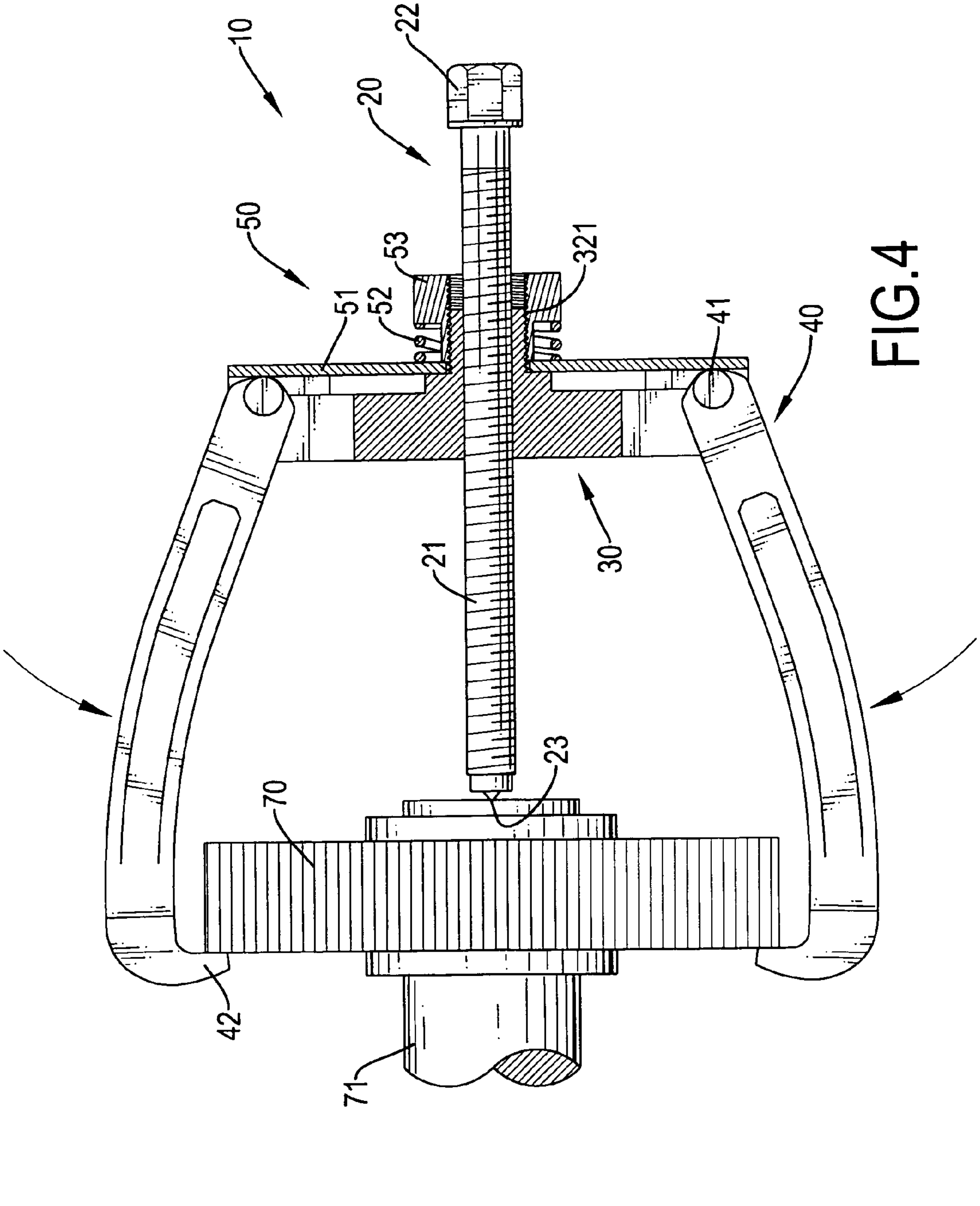
FIG. 4 is an operational side view in partial cross section of the gear puller in FIG. 3 showing that the jaws grip the circular element.

In operation, with reference to FIGS. 3 and 4, the screw shaft (20) is rotated to make the tip (23) contact with the distal end of the shaft (71), and the paws (40) are pivoted to make the hooks (42) grip on the external surface of the circular element (70). Then, further rotating the screw shaft (20), the tip (23) on the screw shaft (20) will push against the shaft (71) and the circular element (70) will be separated from the shaft (71).

Figure 5:
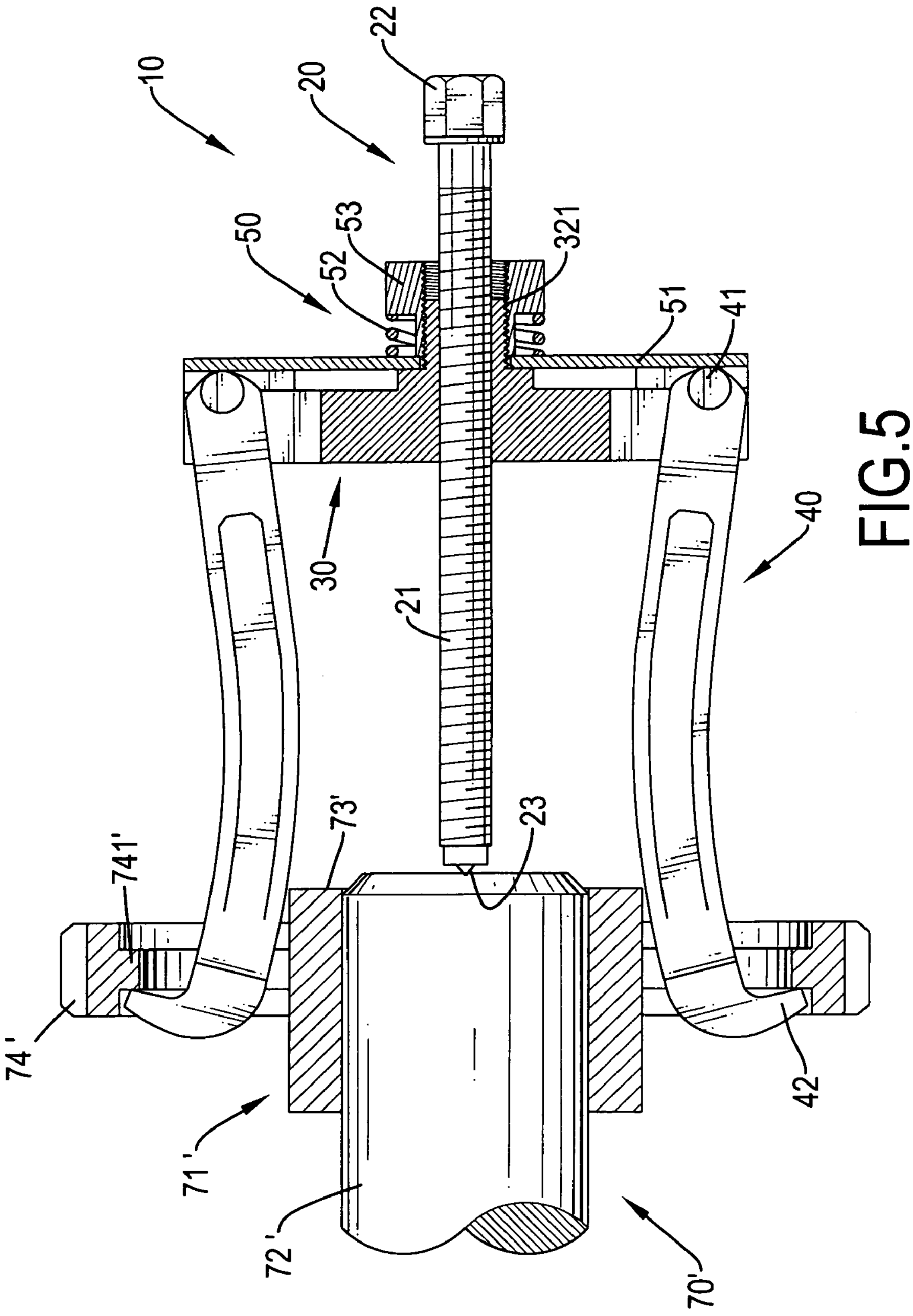
FIG. 5 is a side view in partial cross section of an operational embodiment of a gear puller in FIG. 1 showing that the gear puller is used to pull another type of circular element.

In a second assembled embodiment, with reference to FIGS. 2 and 5, the jaws (40) are pivotally mounted in the grooves (3311) in the hangers (331) and the hooks (42) face outward relative to each other. Accordingly, the gear puller (10) can be applied to a different circular element (70'). Wherein, the circular element (70') has an inner ring (73') and an outer ring (74'). The inner ring (73') is mounted with the outer ring (74') and has a center and a through hole. The through hole is formed in the center of the inner ring (73'). The outer ring (74') has an internal surface and an annular flange (741'). The annular flange (741') is formed on the internal surface of the outer ring (74'). The shaft (72') extends through the center of the circular element (70') and has a distal end. In operation, the tip (23) of the puller gear (10) is moved to contact the distal end of the shaft (72') and to grip the hooks (42) onto the circular groove (741') of the outer ring (74), the screw shaft (20) is then rotated and the circular element (70') can be separated from the shaft (72').

Figure 6:
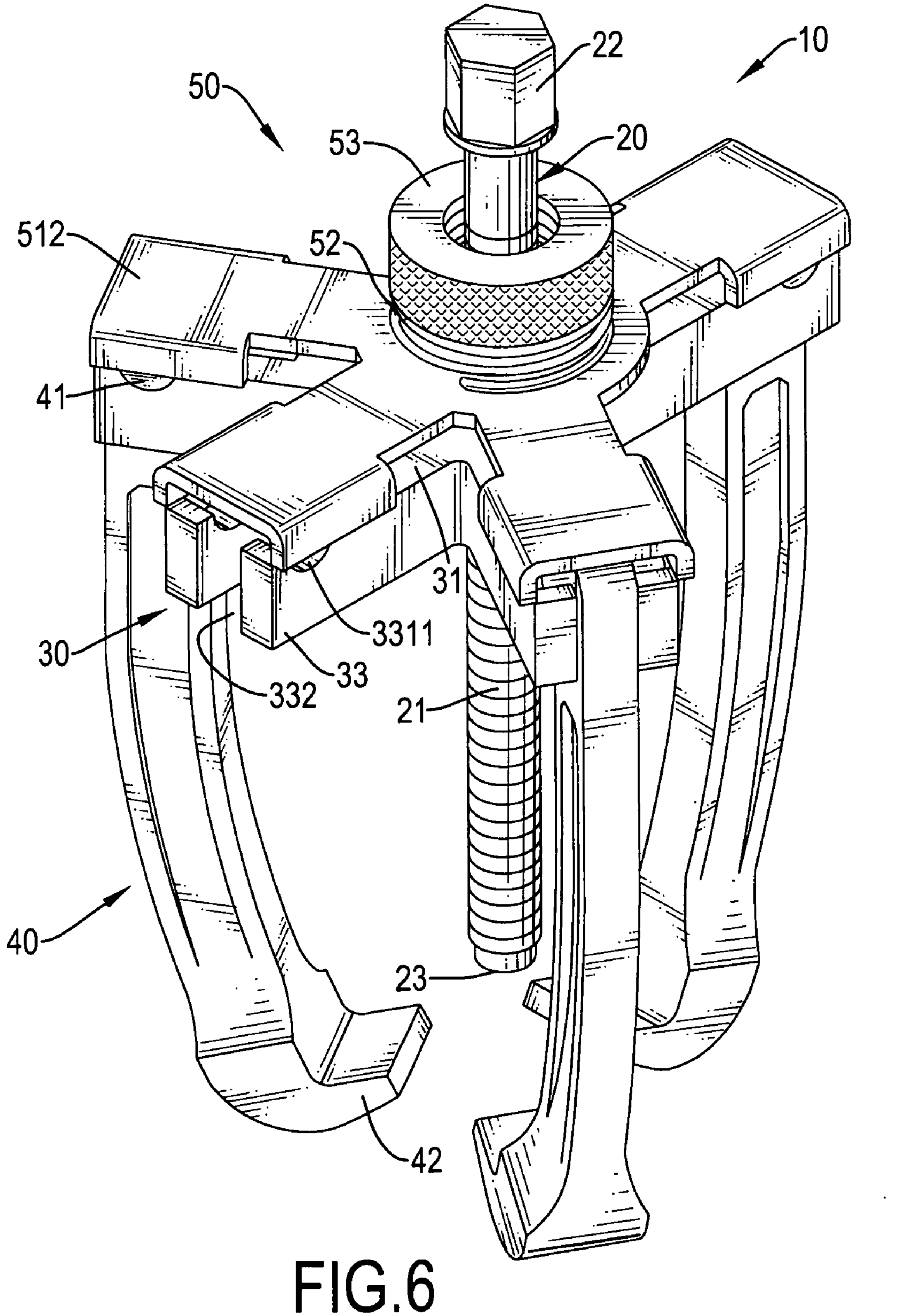
FIG. 6 is a perspective view of another embodiment of a gear puller comprising three paws in accordance with the present invention.
Figure 7:
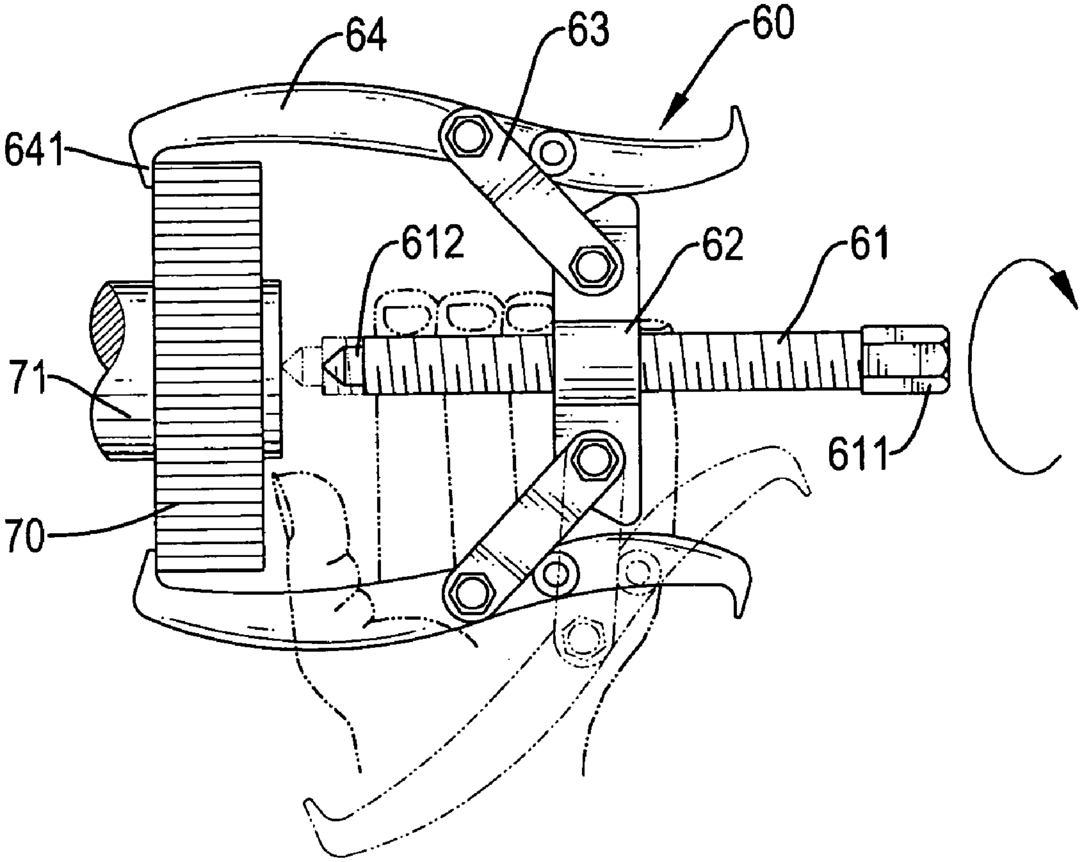
FIG.7 PRIOR ART
FIG. 7 is an operational side plan view of a conventional gear puller in accordance with the prior art.

In alternative embodiments, the connecting seat (30) can be combined with three or more paws (40) as shown in FIG. 6. Accordingly, the puller gear (10) can be applied to different kinds of the circular element (70) (71') based on the user's need. The gear puller (10) in accordance with the present invention has the following advantages.

1. The operation of the gear puller (10) is used with two assemble models by changing the jaws (40) pivotally mounted in the grooves (3311) in the hangers (331) and the hooks (42) face to each other or face outward relative to each other.

2. The gear puller (10) can combine with two paws, three paws or four paws according to the requirement of users, such that the gear puller (10) is versatile in use.

Even though numerous characteristics and advantages of the present utility model have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A gear puller comprising a screw shaft having
- a proximal end;
- a distal end;
- an external surface;
- an outer thread formed on the external surface of the screw shaft; a hexagonal head formed on the proximal end; and
- a tip formed on the distal end of the screw shaft;

a connecting seat connected rotatably to the screw shaft and having
- a body having
  - a top;
  - a bottom;

a center; and a through hole formed in the center of the body;

a threaded stub mounted on the top of the body, being hollow and having an internal surface;

a central hole axially defined through threaded stub and communicated with the through hole in the body an external surface and having an internal surface;

an outer thread formed on the external surface; and an inner thread formed on the internal surface of the central hole and screwed with the outer thread of the screw shaft; and multiple arms formed on and radially extending from the body and each having a proximal end connected with the body;

a distal end;

two hangers formed on and parallelly extending from the distal end of the arm and each having a top; and a groove defined in the top of the hanger; and a gap defined between the hangers;

multiple paws pivotally mounted one the connecting seat and each having a pivot end;

an action end;

a pivotal axle mounted on and laterally extending from the pivot end of the paw and pivotally held inside the grooves of the hangers in one of the arms; and a hook formed on the action end of the paw; and a fixed element mounted around the threaded stub on the connecting seat and the screw shaft and having a fixed board having a central body comprising a top;

a bottom; and a center;

a fixed hole formed in the center of the central body and held the threaded stub; and multiple sheathings radially extending from the central body and contacting the arms on the connecting seat and being U-shaped; a nut screwed onto the threaded stub and having an internal surface; and an inner thread formed on the internal surface and screwed with the outer thread of the threaded stub; and a spring mounted and compressed between the fixed board and the nut to push against the fixed board.

* * * * *